United States Patent
Barber

[15] 3,650,436
[45] Mar. 21, 1972

[54] PNEUMATIC CONVEYOR AND BLENDER

[72] Inventor: Edgar A. Barber, Newaygo, Mich.

[73] Assignee: Combustion Engineering, Inc., Windsor, Conn.

[22] Filed: Jan. 19, 1970

[21] Appl. No.: 3,886

[52] U.S. Cl..............................222/70, 222/193, 222/195, 222/445, 222/450, 222/476
[51] Int. Cl......................................................B67d 5/08
[58] Field of Search..................222/193, 445, 450, 195, 399, 222/70, 476

[56] References Cited

UNITED STATES PATENTS

| | | | |
|---|---|---|---|
| 3,366,277 | 1/1968 | Barber | 222/70 |
| 3,482,714 | 12/1969 | Fujio Oguri et al. | 222/450 X |
| 3,424,349 | 1/1969 | Vance | 222/195 X |
| 3,403,821 | 10/1968 | Blood | 222/55 X |

Primary Examiner—Robert B. Reeves
Assistant Examiner—Francis J. Bartuska
Attorney—Price, Heneveld, Huizenga & Cooper

[57] ABSTRACT

This disclosure relates to a system for fluidizing and transporting particulate material. The particulate material is fed into a fluidizing container from a hopper through two independently operated, serially arranged valves. The valves are controlled such that the closest valve to the container is opened first and closed last, after a charge has been delivered to the container to prevent flow of pressurized air through the hopper. Special blending nozzles are disclosed for an optional blending operation during the fluidizing and transporting process, particularly of certain materials. The outlet conduit from the container has an isolating valve, upstream from a fluid conveyor means, to permit the container to be filled with a new charge while the previous charge is being transported to its destination. Special control means are provided to operate the valves in proper timed sequence to minimize the time cycle for each charge.

15 Claims, 3 Drawing Figures

INVENTOR
EDGAR A. BARBER

INVENTOR
EDGAR A. BARBER
BY Price, Heneveld, Huizenga & Cooper

ATTORNEYS

PNEUMATIC CONVEYOR AND BLENDER

This invention relates to a system for fluidizing and transporting particulate material. In one of its aspects, it relates to a fluidizing system in which particulate material is passed into a fluidizing chamber through serially arranged, independently and sequentially controlled valves.

In another of its aspects, the invention relates to a fluidizing system in which a discharge conduit from a fluidizing chamber has a valve upstream from a conveyor means for the discharge conduit to permit successive charges to be fluidized while previous charges are being transported.

In still another of its aspects, the invention relates to a fluidizing system for particulate material in which both fluidizing means and blending nozzles are provided, each of which is independently controlled.

In systems for fluidizing particulate material such as sand, the particulate material is conventionally dumped in charges into a fluidizing vessel from a hopper. A valve is provided between the hopper and the fluidizing vessel to retain the residual sand within the hopper and to prevent pressurized air from blowing back up through the hopper. Many valve designs have been devised to close off the passage between the hopper and the fluidized vessel. However, many times, sand gets caught in the valve with the result that air flows back up through the hopper during the fluidizing operation. This backflow of air blows the sand into the surrounding area of the fluidizing apparatus, causing a dangerous health condition. Fine sand particles suspended in the air can cause serious eye damage to workers. When other materials are involved more serious hazards may result and in some cases danger of explosion.

I have now discovered that this blow back of air can be prevented by providing a plurality of independently controlled, serially arranged valves between the hopper and the fluidizing container. I have further discovered that plural charges can be fluidized in rapid succession by providing a valve in the exhaust conduit from the fluidizer upstream from the means for transporting the fluidized material through the exhaust conduit.

By various aspects of this invention, one or more of the following, or other, objects can be obtained.

It is an object of this invention to provide an improved system for fluidized particulate material wherein blow back of pressurized air through the supply hopper is prevented.

It is another object of this invention to provide an improved system for fluidizing particulate material wherein successive charges can be fluidized and transported with a minimum cycle time.

It is yet another object of this invention to provide an improved system for fluidizing particulate material wherein means are provided for blending the particulate material prior to transporting of the material in fluidized condition, and independent controls are provided for the operation.

It is still another object of this invention to provide a completely automated system for fluidizing and transporting plural charges of particulate material.

Other aspects, objects, and the several advantages of this invention are apparent to one skilled in the art from the study of this disclosure, the drawings, and the appended claims.

DESCRIPTION OF THE DRAWINGS

The invention will now be described with reference to the accompanying drawings in which.

Figure 1:
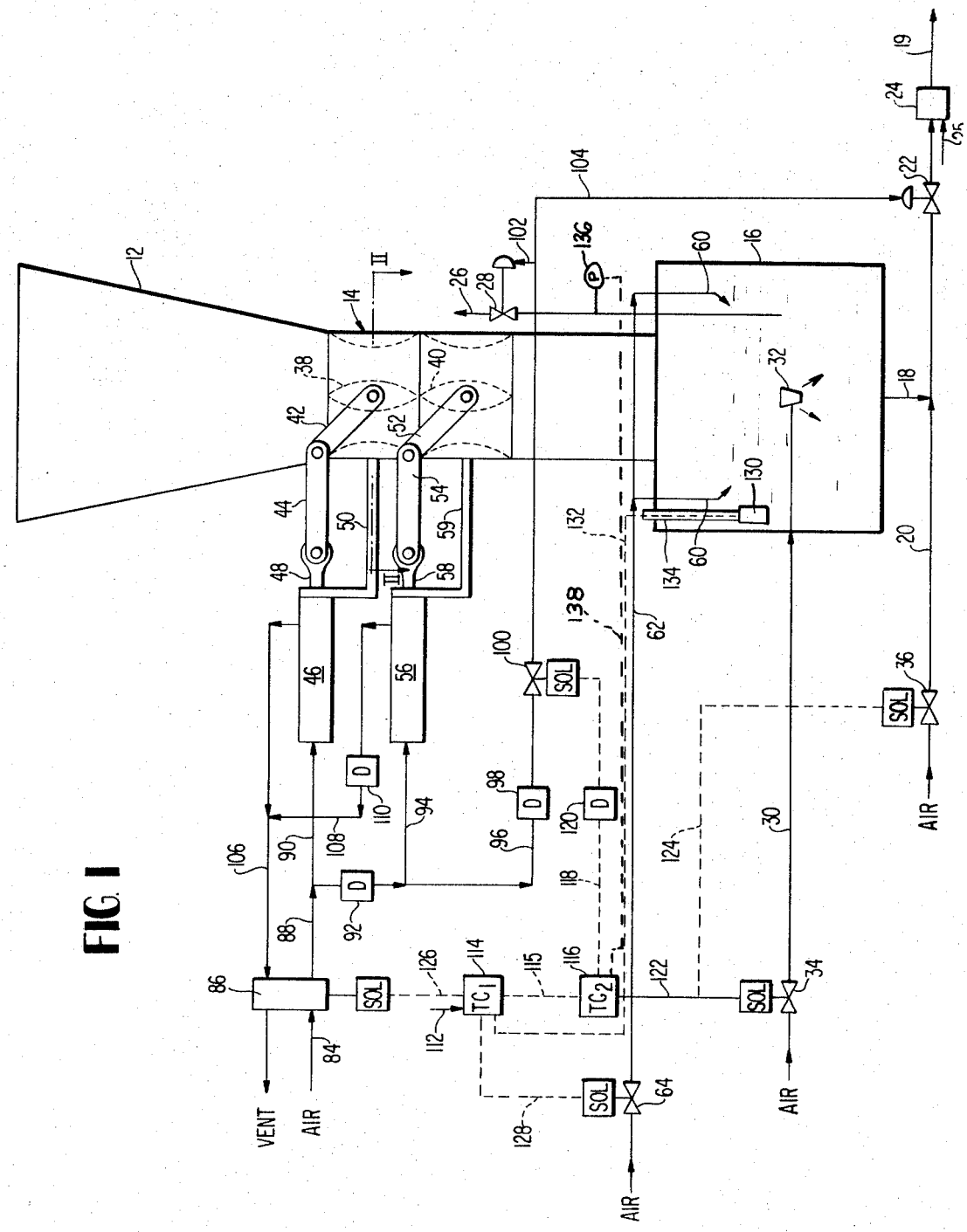
FIG. 1 is a schematic representation of the pneumatic particulate material handling system.

Referring now to the drawings, a hopper 12 contains a charge of particulate material which passes through throat 14 and into container 16. The particulate material is fluidized in the container 16 and passes through a discharge line 18 at the bottom of the container for distribution at a distant point. An air supply line 20 connects with the discharge line 18 at an elbow to aid in the conveying of the particulate material through the discharge line. The particulate material passes through valve 22, and venturi 24 and through line 19 to a predetermined destination. An air supply or booster line 25 is provided for venturi 24 which provides the primary source of power for movement of the fluidized particulate material through the discharge line 18. A valve 36 in line 20 controls the flow of air therethrough.

The particulate material is fluidized in container 16 by air which is supplied through air supply line 30 and through a distributing nozzle 32 which is adapted to disburse the air in a conical downward direction within the container 16. A solenoid operated valve 34 in line 30 controls the flow of air therethrough. The construction of this nozzle is disclosed in FIG. 3 of U.S. Pat. No. 3,366,277 which patent is incorporated herein by reference.

The passage of the particulate material through the throat 14 is controlled by damper valves 38 and 40. Each valve is adapted to close off the throat completely to prevent the flow of particulate material therethrough. Damper valve 38 is rotatably supported within the throat and is rigidly connected to link 42 at the rotatable support. Line 44 connects link 42 to a pneumatic cylinder 46 and piston rod 48. The pneumatic cylinder 46 is supported by L-shaped bracket 50 which is attached to throat 14. The damper valve 40 is similarly supported within throat 14 for rotational movement about a horizontal axis. A link 52 is rigidly connected to the valve at the rotational support and controls the position of the valve by movement thereof. A link 54 connects the link 52 to a piston rod 58 which is actuated by a pneumatic cylinder 56. An L-shaped bracket 59 supports the pneumatic cylinder 56 on the throat 14.

In one embodiment of the invention, the container 16 can be employed as a blender prior to and during the conveying of a predetermined charge of particulate material. The blending action is provided by a plurality of spaced blending nozzles 60 which extend down into the container 16 from the top. The nozzles 60 are supplied with air from line 62. A solenoid operated valve 64 controls the flow of air through line 62.

Figure 2:
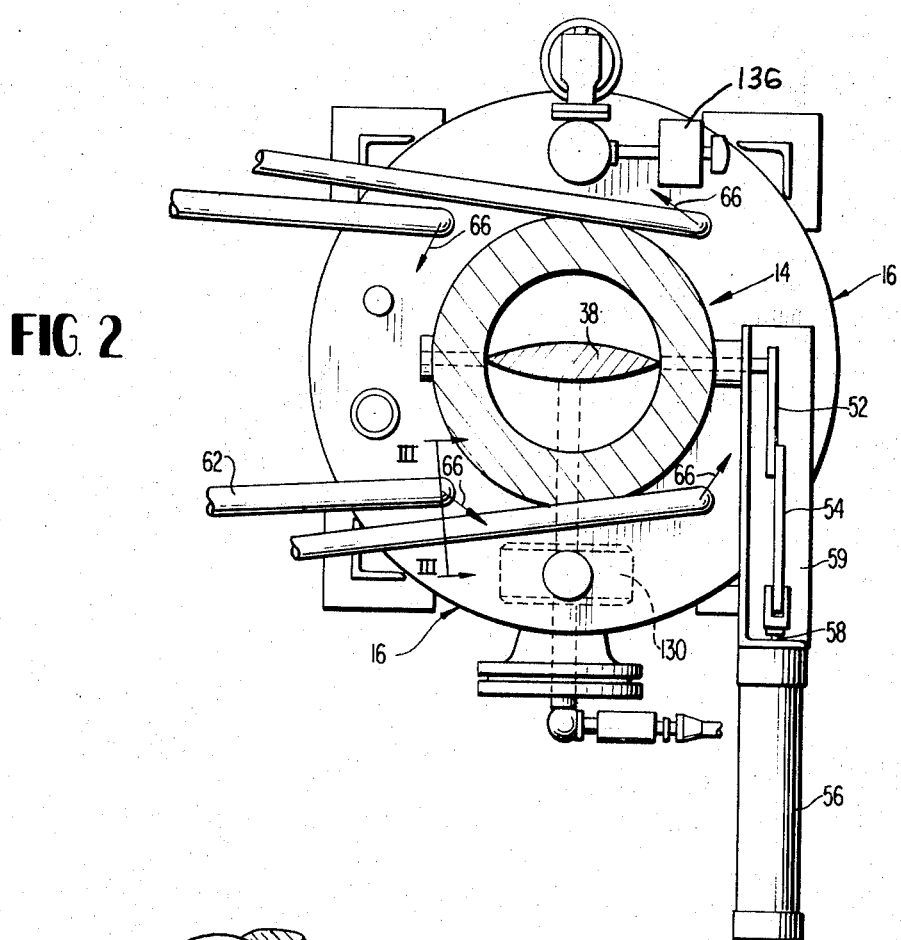
FIG. 2 is a sectional view taken along the plane II—II of FIG. 1.
Figure 3:
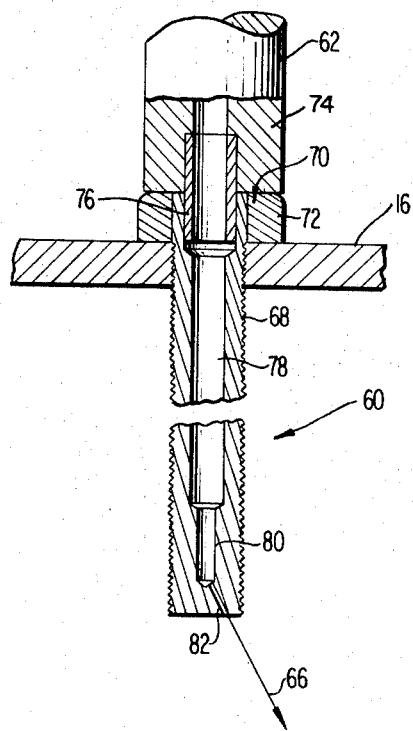
FIG. 3 is a sectional view taken along lines III—III of FIG. 2.

A more complete description of the blending nozzles 60 is shown in FIGS. 2 and 3. The nozzles 60 are adapted to direct a stream of air downwardly and at an acute angle to a line drawn from the nozzles radially inwardly to the center of container 16. As illustrated in FIG. 2, arrows 66 show the direction of the air flow from the nozzles 60. The direction of the nozzles causes a counterclockwise swirling action to take place within the container 16 thereby blending the materials therein. The angle between the discharge of these nozzles and the radial line is less than 90° and preferably about 75°. The direction of air flow in the northern hemisphere is counterclockwise. For the southern hemisphere, the direction of flow would be clockwise.

It is to be understood that for the purpose of blending, a plurality of hoppers, each dispensing a different material, can be arranged to discharge into the hopper 12 so as to feed the diverse material into hopper 12. Alternately, hopper 12 can have a plurality of compartments formed by vertical dividers, each of which compartments feeds a predetermined amount or metered amount of particulate material to throat 14 and into container 16. Many other means of feeding different materials to be blended into hopper 12 and into container 16 are within the skill of the art.

The blending nozzles 60 contain a threaded outer surface 68 for securing the blending nozzles to the top of container 16. Alternately a cord grip type sleeve connector could be employed in place of the threaded connections illustrated. In this manner, the depth of the blending nozzles 60 within the container 16 can be adjusted. For example, the height of the blending nozzles above the bottom of the fluidizing chamber can be varied depending upon the material being blended. The air supply hose is connected to the upper portion of the nozzles 60 through a threaded plug 70 which threadably engages a tapped bore 76 at the upper portion of the nozzles 60. A fitting 74 on air hose 62 threadably engages the outer threaded surface of plug 70. The nozzles are secured in the desired position in container 16 by a bolt 72 which threadably engages the upper outer portion of nozzles 60.

The nozzles 60 have a central bore 78 with a reduced diameter end 80. A saw cut opening 82 provides communication between the central bore and the container 16. The air passing through hose 62 is directed down bore 78 and out through the saw cut opening 82 in the direction of the arrows 66.

Referring now again to FIG. 1, the pneumatic cylinder 46 is operated by air which is supplied through air supply line 84, through solenoid operated distribution valve 86, through line 88 and line 90. The pneumatic cylinder 56 is operated to close valve 40 by air which passes through line 84, solenoid operated distribution valve 86, through line 88, through time delay means 92 and to branch 94.

Pneumatic cylinder 46 operates to open the valve 38 by moving the position of valve 86 so as to exhaust the pressure in line 88 and to pass air from line 84 through line 106 to the right end of cylinder 46. At the same time, air passes through line 108 and through delay 110 and, after a predetermined delay, to the right end of cylinder 56.

Valve 28 is operated by pneumatic pressure or air which passes through line 84, valve 86, line 88, time delay means 92, line 96, time delay means 98, valve 100 and branch 102. Valve 22 is operated at the same time and in the same manner as valve 28 by pneumatic pressure or air which passes through line 104. All time delay means are conventional devices for delaying the passage of fluid pressure through the lines in which they are positioned. Such devices can be electrical or mechanical, or electromechanical in nature and are well known to the art.

A level sensing device 130 is suspended from an adjustable support 134 within the container 16 as a safety device. The level sensing device 130 communicates with time controller 114 through control line 132. A signal from the level sensing device 130 will override input signal 112 and prevent further material from being dumped into the container 16. Thus when material in container 16 reaches the level of the level sensing device 130, a signal will be sent from 130 to the time controller 114 to cause valves 38 and 40 to close. Further dumping of material will thereby be stopped until the system has conveyed the material through discharge lines 18.

The level sensing device 130 can be any suitable device to sense the level of material within a container that becomes pressurized. A suitable device is a "Proxy Level Control" sold by Proximity Controls, Inc. of Furnace Falls, Minnesota.

A pressure switch 136 is mounted on the vent line 26 to sense the pressure drop in container 16. A control line 138 is connected between time delay controller 116 and the pressure switch 136 to signal the time delay controller 116 when a predetermined pressure drop has occurred in the container 16.

In operation, a charge of particulate material such as fine sand is introduced into hopper 12. Valves 38 and 40 will be open as illustrated in FIG. 1. At this time, valves 64, 34, 36, and 22 will be closed. Valve 28 and valve 100 will be open. The material in hopper 12 will pass into the container 16 through open valves 38 and 40. An input 112 signals a time controller 114 which begins the cycle. The input can be a signal from another time controller such as a computer or cyclic signal generator, or can be merely a manual button.

The time controller 114 signals solenoid operated distribution valve 86 through control line 126 to open, admitting air from line 84 to line 88 and into one end of pneumatic cylinder 46. This closes valve 38 by the extension of piston rod 48 and the rotation of link 42 about the valve axis. The air also initiates operation of the time delay means and, after a short delay, the time delay admits air to one end of pneumatic cylinder 56 through the branch line 94. The signal delay is in the order of one second or slightly less. This delay gives the sand or other particulate material enough time to pass down into the container from the throat below the valve 38, emptying the space between the valves. The valve 40 then closes by extension of piston rod 58 and rotation of link 52 in a clockwise direction about the axis of valve 40.

The opening of time delay 92 admits air to the delay 98, and after a short time delay, approximately one second or less, the delay 98 admits air to valve 100 and through branch 102 to close valve 28. Valve 28 is a conventional air actuated valve such as a spring biased diaphragm operated valve.

Simultaneously with the sending of a signal from controller 114 to valve 86, a signal is sent through control line 115 to a time delay controller 116. After a delay which is greater than the time delay through delay means 92 and delay means 98, a signal is sent through control line 122 to a solenoid operated valve 34 in line 30 to open that valve causing air to pass through line 30 and into nozzle 32. This initiates fluidization of the particulate material within the container 16. Simultaneously, a signal is sent through control line 124 to solenoid operated valve 36 so that valve 36 is opened, permitting air to pass through line 20 into the discharge line 18. With the valve 22 open, the particulate material which has been fluidized within container 16 is conveyed out through the discharge line 18.

After a predetermined time, of sufficient duration to permit all of the material within the container 16 to be fluidized and discharged into the discharge line 18, the time delay controller 116 will signal valves 34 and 36 to close providing pressure switch 136 senses a predetermined drop in pressure in container 16, thereby cutting off the flow of air through line 30 and into container 16. In the event that a predetermined pressure drop has not occurred in container 16, then the pressure switch will override time controller 116 until the pressure drop has occurred. Simultaneously therewith, a signal will be sent through line 118, through delay 120, and to valve 100 to cause valve 100 to close, thereby opening valve 28 and closing valve 22. Due to the fact that the venturi 24 is downstream from valve 22, the particulate material will continue to be moved through the line 19 downstream from the venturi 24. The valve 22 however prevents the backflow of particulate material through discharge line 18 into container 16 and out through vent 26 or up through hopper 12. Further, the use of the valve 22 permits other boosters to be used in the line 19 downstream of venturi 24. This is important in systems where line 19 may extend for hundreds of feet. Additional charges can then be fluidized and discharged while the initial charge is still in transport.

Simultaneously with the closing of valve 100, valve 86 will shift due to a signal from time controller 114 to cause air to flow through line 106 to the other end of pneumatic cylinder 46 to thereby open valve 38. After a short time delay due to time delay means 110, the air will pass through line 108 to the other end of pneumatic cylinder 56 thereby opening valve 40. Another charge then passes into container 16 from hopper 12. The length of time which valves 38 and 40 are open can be controlled by a timer in time controller 114 and level sensing device 130 so that the cycle continues and repeats itself without any further manual operation.

As is obvious from the foregoing, the operation of the device is complete for a given particulate material without the use of the blending nozzles 60. However, in the event that it is desirable to blend materials within container 16, the operation of the device is as follows.

Time controller 114 signals the closing of valves 38 and 40 after the charge has been delivered to container 16 as has been described above. At that time, a signal is sent through line 128 to solenoid operated valve 64 to open that valve permitting air to pass through line 62 and into the blending nozzles 60. This event takes place after the closing of valve 28. Very shortly thereafter, within a second or two, the time delay 116 then opens valves 34 and 36 to permit fluidizing and discharge of the fluidized and blended material through the discharge line 18. The flow of air through nozzles 60 continues during the entire fluidizing and transporting operation. The valve 64 is then closed by a signal from the time controller 116 via control line 128 simultaneously with the closing of valves 34, 36 and 22 providing pressure switch 136 has sensed a predetermined drop in pressure in container 16. The operation of the conveyor and fluidizing apparatus is otherwise identical to the description of the operation set forth above.

Whereas the invention has been described with reference to certain pneumatic and electrical controls, it it understood that the invention is not limited thereto. Suitable pneumatic controls can be substituted for the electrical controls and vice versa.

The invention can be used for all types of flowable materials including dry sand, new sand, coal, bentonite, fire clay, wood flour and the like. The fluidizing medium will be chosen to suit the type of material to be transported. In most cases compressed air will be used. Other gases can also be used according to the invention.

The invention provides a system for rapidly fluidizing and conveying charges of particulate material. The charges are accurately measured, fluidized, and dispensed in rapid succession. Each charge can be fluidized and transported before the previous charge has reached its destination. Further, with the use of the control system, special batching apparatus can be eliminated.

The use of the two valves 38 and 40 at the throat 14 prevents the blowing of air into the hopper during the fluidizing operation. Occasionally sand gets caught between a valve and the valve seat. When the fluidizing operation occurs, air under high pressure blows back up through the hopper, thereby blowing sand in the hopper into the surrounding area. This sand in the air is very dangerous to the eyes and presents a health hazard. The double valve arrangement permits all sand on the lower valve to pass into the container prior to closing of this valve. The lower valve can then close completely to prevent air passage therethrough.

The use of the two valves 38 and 40 also increases the life span of the machine before it must be shut down for repair. Sand is a very abrasive medium which makes valve life very short. When two valves are used, it has been found that the valve life is twice as long. In other words, the machine can operate twice as long before it needs to be shut down for repair of valves 38 and 40. Once the machine is shut down, the length of time required to replace one valve is not significantly less than two valves when considering the down time attendant for the rest of the production line. The lower valve 40 opens before the upper valve 38. This operation increases the life of valve 40 since there is no abrasive material to act against the seal of valve 40 during the opening and closing thereof.

The blender disclosed hereinbefore can be used to blend additives into the sand which is then conveyed to its destination, or it can be used as a blender of additives which are conveyed to a muller wherein the blended additives can be mixed with various sand mixtures. Thus, the inventive apparatus can be used as a preliminary blender for sand additives, or it can be used as a blender for the final sand composition.

The pressure switch 136 provides a means to prevent charging of container 16 before the transporting or conveying cycle has been completed. The timing is set for a predetermined pressure in a given plant. Occasionally the pressure will drop thereby extending the time required for transporting all of the sand from the container 16. The pressure switch thus overrides the timing controls in the event of a pressure drop in the plant.

Reasonable variation and modification are possible within the scope of the foregoing disclosure and drawings without departing from the spirit of the invention.

The embodiments of the invention in which an exclusive property or privilege is claimed are defined as follows:

1. In a system for fluidizing and transporting particulate materials, said system comprising:

a fluidizing container having an inlet opening and an outlet opening;

supply means communicating with said inlet opening for supplying particulate material thereto;

means for fluidizing particulate material within said container;

an outlet conduit communicating with said outlet opening; conveyor means in said outlet conduit for conveying fluidized particulate materials through said outlet conduit; and a vent conduit communicating with said fluidizing container; the improvement which comprises:

first and second valve means serially arranged between said supply means and said fluidizing container, each of said first and second valve means adapted to close off the flow of material between said supply means and said fluidizing container;

outlet valve means in said outlet conduit between said conveyor means and said outlet opening;

vent valve means in said vent conduit;

first control means operably connected to said vent valve means and to said outlet valve means for closing said vent valve means when said outlet valve means is open and for opening said vent valve means when said outlet valve means is closed;

second control means for said first and second valve means for closing said valves in timed sequence whereby the valve closest to said supply means closes first and the valve nearest said container means closes thereafter; and means operably connecting said first and said second control means to actuate said first control means to close said vent valve in said vent conduit and open said outlet valve in said outlet conduit after said first and second valves have been sequentially closed.

2. A system for fluidizing and transporting particulate material according to claim 1 further comprising a time delay means between said first control means and said second control means for closing said vent conduit valve means and opening said outlet conduit valve means a predetermined time after the closing of said first and second valve means.

3. A system for fluidizing and transporting particulate material according to claim 2 further comprising third control means to initiate operation of said fluidizing means, said third control means being operably associated with said first and second control means so as to commence operation of said fluidizing means after closing of said vent valve.

4. A system for fluidizing and transporting particulate material according to claim 2 further comprising a pressure sensing means to sense the drop in pressure within said fluidizing container and means overriding said time delay means until after a predetermined pressure drop in said fluidizing container.

5. A system for fluidizing and transporting particulate material according to claim 1 further comprising fluidizing control means operably associated with said second valve control means to initiate operation of said fluidizing means in timed relationship subsequent to the closing of said first and second valves.

6. A system for fluidizing and transporting particulate material according to claim 1 further comprising blending nozzles arranged about said fluidizing container to impart a circular blending action to particulate material therein, and means to supply fluid pressure to said blending nozzles.

7. A system for fluidizing and transporting particulate material according to claim 6 wherein said nozzles have an opening for fluidized pressure which is directed downwardly and circumferentially with the line of fluid from said nozzles forming an angle of less than 90 degrees with a radial line from the center of said fluidizing container.

8. A system for fluidizing and conveying particulate material according to claim 11 wherein said angle of said fluid flow line from said nozzles is about 75° with respect to said radial line.

9. A system for fluidizing and conveying particulate material according to claim 10 further comprising means operably connected to said fluidizing means and to said fluid supply means for said blending nozzles to commence flow of said fluid to said nozzles and then to commence operation of said fluidizing means in timed sequence.

10. A system for fluidizing, blending and transporting particulate materials, said system comprising:
   a fluidizing container having an inlet opening, an outlet opening, and a vent;
   means communicating with said inlet opening for supplying particulate material thereto;
   means for fluidizing particulate material within said container;
   means to supply fluid pressure to said fluidizing means;
   blending nozzles arranged about said fluidizing container to impart a circular blending action to particulate material therein;
   means to supply pressurized fluid to said blending nozzles; and
   sequential control means operably connected to said vent, to said fluid supply means for said blending nozzles and to said fluidizing means to first commence flow of said fluid pressure to said nozzles, then to close said vent and then to commence operation of said fluidizing means in timed sequence.

11. A system for fluidizing and transporting particulate material according to claim 10 further comprising an outlet conduit communicating with said outlet opening; means in said outlet conduit for conveying fluidized particulate material through said outlet conduit; and valve means in said outlet conduit between said conveying means and said outlet opening to selectively close off said outlet conduit while conveying fluidized particulate material through said outlet conduit downstream of said valve.

12. A system for fluidizing and transporting particulate material according to claim 11 further comprising a vent conduit communicating with said fluidizing container; a valve means in said vent conduit; and first control means operably connected to said vent conduit valve means and to said outlet conduit valve means for closing said vent conduit when said outlet conduit valve means is open, and for opening said vent conduit valve means when said outlet conduit valve means is closed.

13. A system for fluidizing and conveying particulate material according to claim 10 wherein said nozzles have an outlet opening for said fluid pressure so as to direct said fluid pressure downwardly and circumferentially with the line of fluid from said nozzles forming an angle of less than 90 degrees with a radial line from the center of said fluidizing container.

14. A system for fluidizing and conveying particulate material according to claim 13 wherein said angle of said fluid flow from said nozzles is about 75 degrees with respect to said radial line.

15. The apparatus recited in claim 13 wherein said nozzles are vertically adjustable to permit the distance they project into said vessel to be adjusted.

* * * * *